E. J. BOWMAN.
RADIATOR.
APPLICATION FILED DEC. 7, 1917.
1,311,549.
Patented July 29, 1919.
4 SHEETS—SHEET 1.
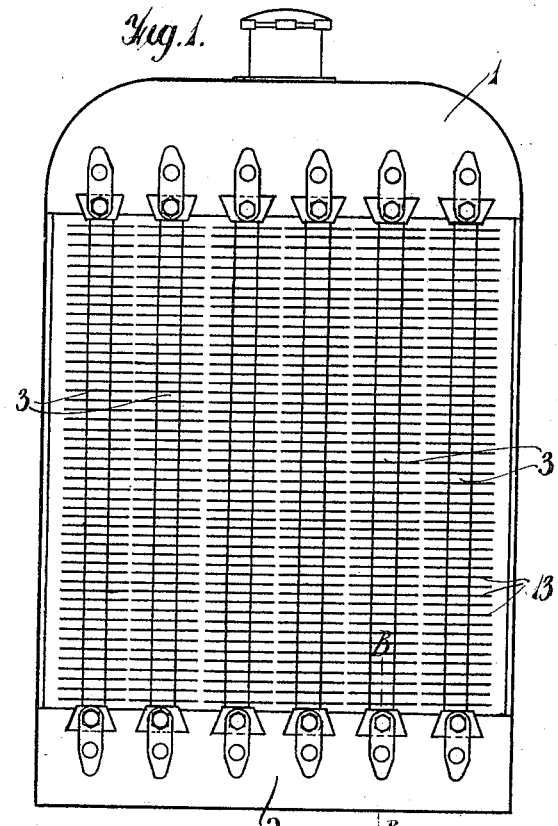
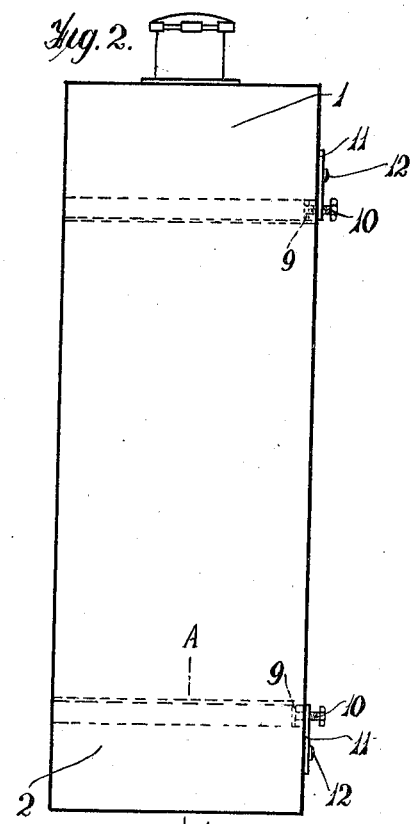
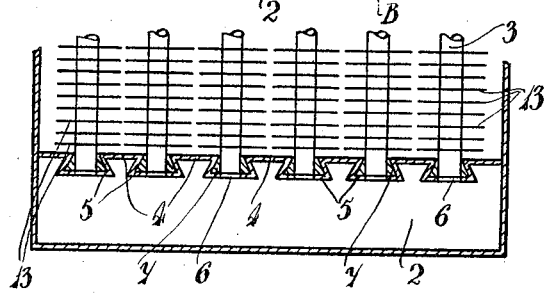
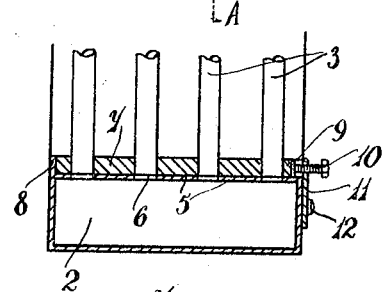
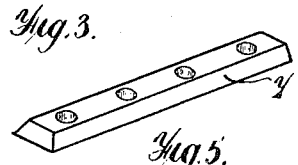
INVENTOR:
E. J. BOWMAN
BY: H. Van Deventer
ATTORNEY.

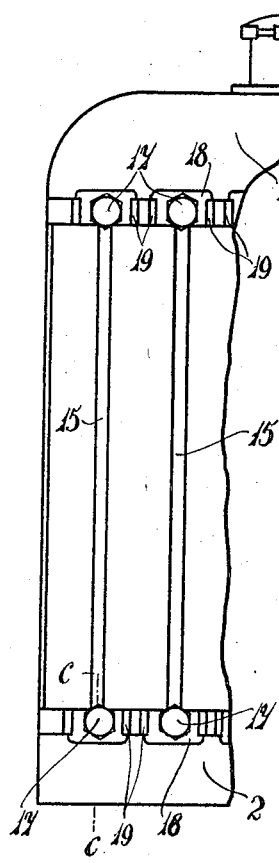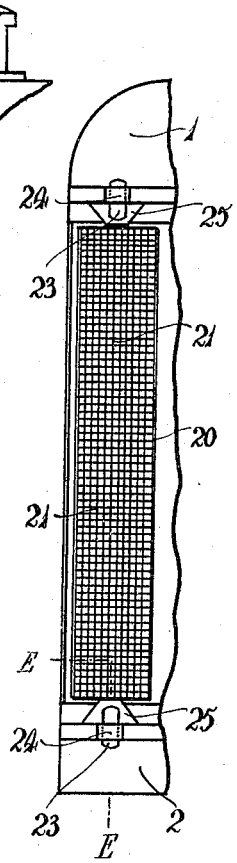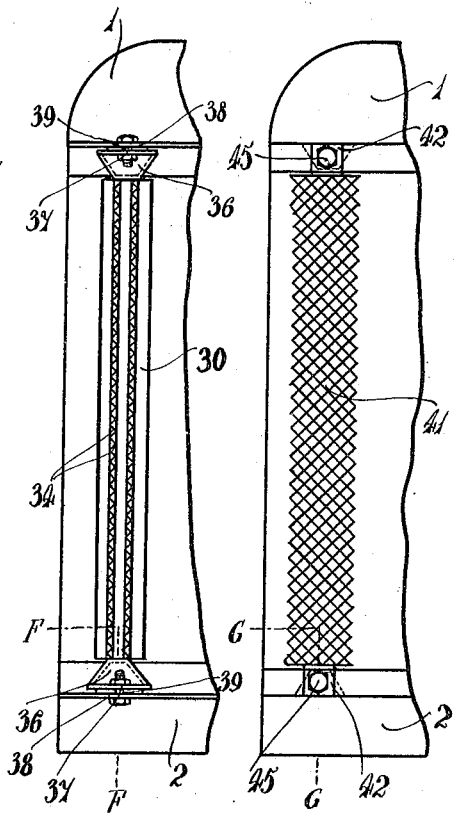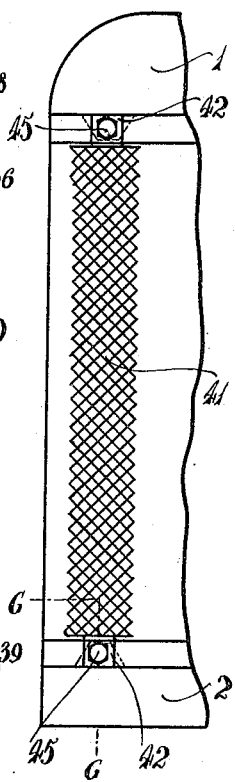

E. J. BOWMAN.
RADIATOR.
APPLICATION FILED DEC. 7, 1917.
1,311,549.
Patented July 29, 1919.
4 SHEETS—SHEET 3.
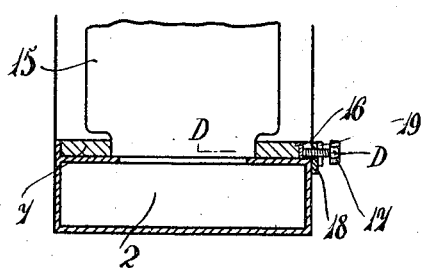
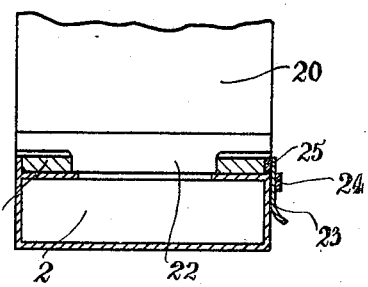
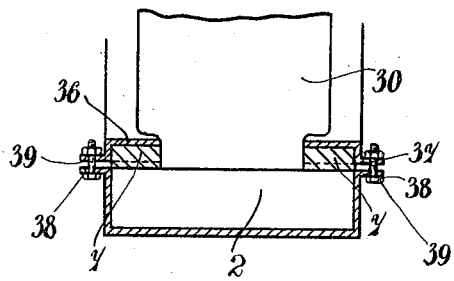
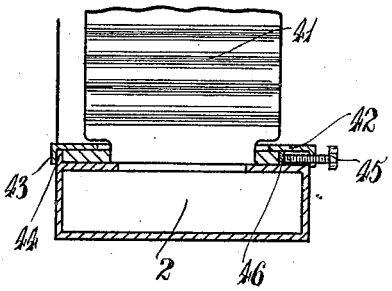
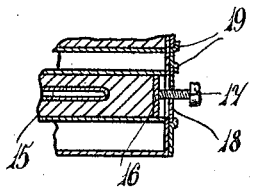
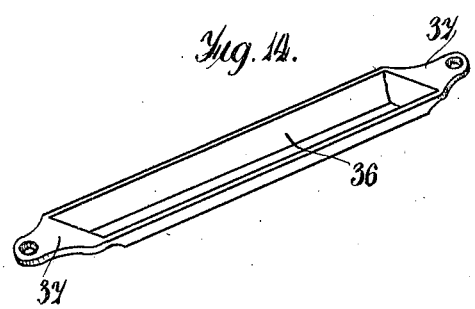
INVENTOR:
E. J. BOWMAN
BY: H van Dittmund
ATTORNEY.

E. J. BOWMAN.
RADIATOR.
APPLICATION FILED DEC. 7, 1917.
1,311,549.
Patented July 29, 1919.
4 SHEETS—SHEET 4.
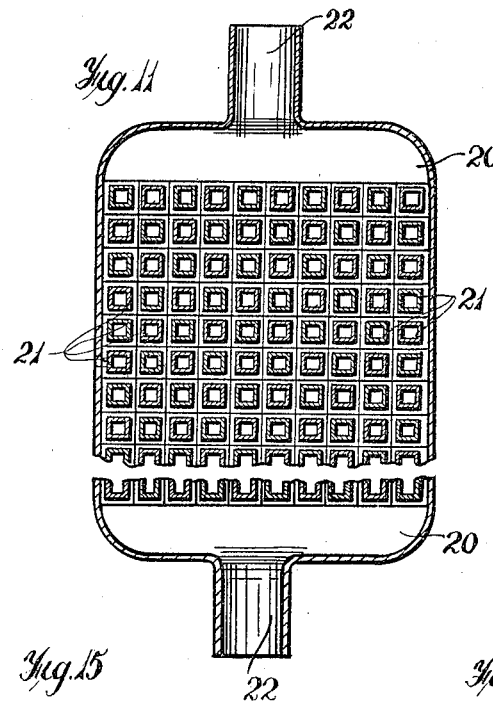
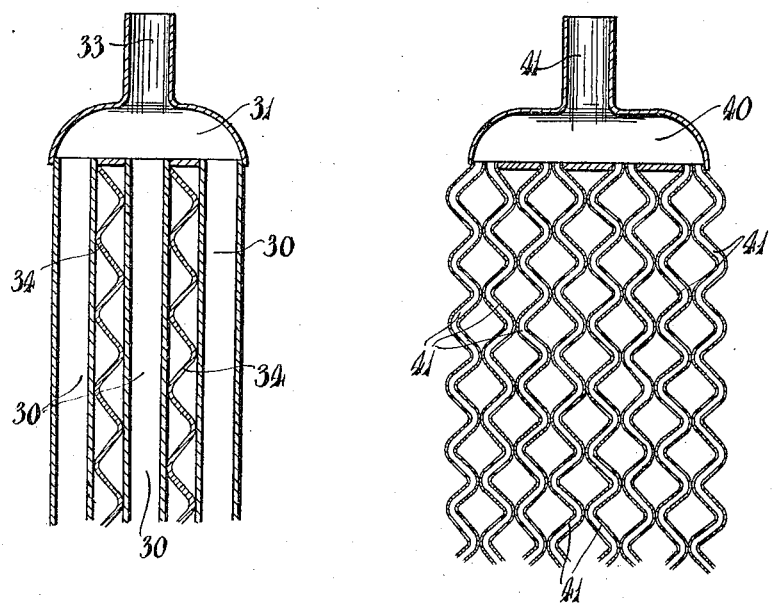
INVENTOR:
E. J. BOWMAN
BY: H van Dedemnul
ATTORNEY.

UNITED STATES PATENT OFFICE.

EDWIN JAMES BOWMAN, OF BIRMINGHAM, ENGLAND, ASSIGNOR OF ONE-THIRD TO PERCY WILLIAM WADE, OF BIRMINGHAM, ENGLAND.

RADIATOR.

1,311,549. Specification of Letters Patent. Patented July 29, 1919.

Application filed December 7, 1917. Serial No. 206,048.

*To all whom it may concern:*

Be it known that I, EDWIN JAMES BOWMAN, subject of the King of Great Britain, residing at 257 Warwick road, Greet, Birmingham, in the county of Warwick, England, have invented a new and useful Radiator; and I do hereby declare the following to be a full, clear, and exact description of the same.

My invention comprises improvements in radiators for use as heating, cooling, condensing or like apparatus, more particularly radiators for use with internal combustion engines, and has for its object to provide an improved means of securing the circulating tubes in the tanks, this method of securing the tubes obviating the necessity of dismantling the radiator or the like for the purpose of repairing the joints and also reducing the liability to fracture as compared with those radiators made with rigid joints.

According to this invention the tubes are secured in position by means of rubber or equivalent flexible members, these rubber members being compressed so as to tightly surround the tubes and tightly fit within the tanks so as to provide a water-tight joint between the tubes and tanks.

Referring to the drawings:—

Figure 1. is a front elevation of a radiator according to one form of the invention.

Fig. 2 is a side elevation of same.

Fig. 3. is a section through the lower tank at A—A in Fig. 2.

Fig. 4. is a similar section at B—B in Fig. 1.

Fig. 5. illustrates one of the rubber members removed.

Fig. 6. is a partial front elevation of a modified form of the invention in which simple flat tubes are used.

Fig. 7. is a sectional view through the lower tank at C—C in Fig. 6.

Fig. 8. is a horizontal section at D—D in Fig. 7.

Fig. 9. is a partial front elevation of another form of the invention in which the main vertical tubular member carries a series of horizontal tubes for the circulation of air.

Fig. 10 is a section through the lower tank at E—E in Fig. 9.

Fig. 11. is an enlarged sectional view of part of one of the main tubular members removed.

Fig. 12. is a partial front elevation of another form of the invention.

Fig. 13. is a sectional view through the lower tank of F—F in Fig. 12.

Fig. 14. illustrates one of the clamping members removed.

Fig. 15. is an enlarged sectional view of part of one of the vertical tubular members.

Fig. 16 is a partial front elevation of another modified form of the invention.

Fig. 17 is a sectional view of the lower tank at G—G in Fig. 16.

Fig. 18. is an enlarged section of part of one of the vertical tubular members.

In the form of the invention illustrated upon the accompanying drawings at Figs. 1-5, the radiator comprises an upper tank 1 and a lower tank 2, these two tanks being connected together by vertical tubes 3 so as to enable the water to circulate between the upper and lower tanks on the well-known thermo-siphon principle.

The upper surface 4 of the lower tank 2 is formed to provide a series of parallel grooves 5 of dovetail section and having either a series of openings as 6 or a single elongated opening extending for the full length of the grooves. The lower surface member of the upper tank is provided with similar grooves and holes to those provided in the lower tank.

Within each of these grooves is placed a rubber or equivalent resilient member as 7 illustrated at Fig. 5 which is of similar section and adapted to be inserted endwise into its groove.

In practice the lower ends of a series of tubes are placed in one resilient member and the upper ends in another resilient member, these resilient members being then inserted endwise into grooves in the upper and lower tanks, the one end of the grooves being open to permit this as shown by Fig. 4. Similarly the four tubes and two resilient members may be all removed *en bloc* if necessary for repairs.

As will be seen in Fig. 4, the one end of the groove is closed by an abutment 8, while at the opposite end a sliding abutment piece 9 is provided within the groove to enable the resilient member to be compressed. The necessary compression is obtained by the screw 10 carried by the member 11 which is pivoted at 12 to the tank in such manner that the member 11 and screw 10 may be moved angularly so as not to obstruct the open end of the groove when it is desired to insert or remove one of the resilient members.

The tubes may or may not be provided with gills as 13.

As will be seen, the radiator is built in parts, i. e., rows of tubes carried by resilient members, and in the event of one of the tubes being damaged the one row of tubes may be removed, the damaged tube replaced and the resilient members and tubes re-inserted, thereby avoiding the necessity of taking down the whole radiator for re-soldering as is now required with the radiators at present in use.

At Figs. 6, 7 and 8 a modified form of radiator is shown in which flat tubes 15 are employed which extend right across the radiator, one tube 15 being employed instead of the four tubes shown by Fig. 4. In this construction a single elongated hole is made within the resilient member and the necessary compression is obtained by a sliding block 16 and screw 17, the screw 17 being carried by a detachable member 18 which is dropped into guides 19.

At Figs. 9–11 another form of construction is shown in which the radiator is built in sections, there being one section for each pair of grooves. Each section comprises a main tubular member 20 which carries a series of horizontally disposed tubes 21 the extremities of which are preferably enlarged so as to fit closely against each other at the front and back, but leaving a space over the greater part of the length of the tubes through which the water may circulate as is common in the well-known honeycomb type of radiator. The upper and lower extremities of the member 20 are provided with projections as 22 which may or may not be of elongated section and which fit within holes in the resilient member in the same way as the simple tubes previously described. The resilient members are then placed within the grooves and compressed around the parts 22, the compression being maintained by the key piece 23 which is inserted through an eyed member 24 on the tank, the extremity of the member 23 fitting on the outside of a sliding block 25 and serving to entirely close the end of the groove.

In the form of the invention shown at Figs. 12–15 the radiator is again built in sections each comprising three elongated parallel tubes 30 or three rows of small tubes secured to upper members 31 in similar lower members, these upper and lower members having elongated projections 33 which fit within the rubber members in manner previously described. Intermediate between the tubes 30 are radiating members 34 bent to a zigzag form.

In this form of the invention grooves are not provided in the tanks, but a loose member 36 shaped to fit over the resilient member is provided having a lug 37 at its extremity adjacent to a lug 38 on the tank, these two lugs being adapted to be brought together by a screw 39 and thereby compress the resilient member between the part 36 and the surface of the tank.

Another form of the invention is shown at Figs. 16–18 in which the radiator is again built of sections comprising upper and lower members as 40 connected by a series of zigzag tubes 41 of elongated section horizontally, the member 40 having a projection 41 adapted to fit within the rubber member in manner previously described. A metal member 42 having an elongated hole fits over the ends of the tubes and above the resilient members which are placed within grooves in the tanks. The one end 43 of the member 42 overlaps an abutment 44 on the tank while its other end carries a screw 45 which engages with a sliding member 46 within the groove and serves to compress the resilient member around the tube to provide the water-tight connection.

The grooves in the upper and lower surfaces of the tank may be conveniently made by bending the metal of the tank to the requisite section, or they may be built up or otherwise formed as desired.

In practice the rubber or other resilient members would, of course, be made slightly longer than the length of the grooves, the excess being compressed into the grooves to provide the necessary tight joint. This rubber member may be of any suitable section such as rectangular or round, though a dovetail section is preferred, or two or more sections or parts of rubber may be employed in each groove if so desired.

What I claim then is:—

1. In a radiator the combination of an upper tank; a lower tank; a resilient member independently mounted in each of said upper and lower tanks and extending from back to front thereof; a tube connecting said upper and lower tanks and having its extremities disposed within said resilient members; and means for individually and separately compressing said resilient members so as to establish a water-tight joint between said tube and tanks.

2. In a radiator the combination of an upper tank; a lower tank; a series of vertically disposed tubes connecting said upper and lower resilient members and disposed in rows from back to front thereof; resilient members in each of said upper and lower tanks extending from back to front thereof and each resilient member fitting around the ends of a row of tubes; and means for compressing said resilient members so as to establish a water-tight joint between said tubes and tanks.

3. In a radiator the combination of an upper tank having a series of parallel grooves disposed across its under surface; a lower tank having a series of parallel grooves disposed across its upper surface; a resilient member in each of said grooves; a series of vertically disposed tubes connecting the upper and lower resilient members; and means for compressing said resilient members within the grooves so as to establish a water-tight joint between said tubes and tanks.

4. In a radiator the combination of an upper tank having a series of parallel grooves disposed across its under surface and being closed at one end and open at the other end; a lower tank having a series of parallel grooves disposed across its upper surface and being closed at one end and open at the other end; a resilient member in each of said grooves; a series of vertically disposed tubes connecting the upper and lower resilient members; and means for compressing said resilient members within the grooves so as to establish a water-tight joint between said tubes and tanks.

5. In a radiator the combination of an upper tank having a series of parallel grooves disposed across its under surface and being closed at one end and open at the other end; a lower tank having a series of parallel grooves disposed across its upper surface and being closed at one end and open at the other end, a resilient member in each of said grooves; a series of vertically disposed tubes connecting the upper and lower resilient members; and screw means for compressing said resilient members within the grooves so as to establish a water-tight joint between said tubes and tanks.

6. In a radiator the combination of an upper tank having a series of parallel grooves disposed across its under surface and being closed at one end and open at the other end, a lower tank having a series of parallel grooves disposed across its upper surface and being closed at one end and open at the other end; a resilient member in each of said grooves, a series of vertically disposed tubes connecting the upper and lower resilient members; a series of pivoted members on said tanks one adjacent each groove; and a screw carried by each of said pivoted members and each serving to compress a resilient member within its groove so as to establish water-tight joints between said tubes and tanks.

In testimony whereof I have signed my name to this specification.

EDWIN JAMES BOWMAN.

Copies of this patent may be obtained for five cents each, by addressing the "Commissioner of Patents, Washington, D. C."